J. P. SPOFFORD.
Saw Gummer.
No. 10,415.
Patented Jan. 10, 1854.
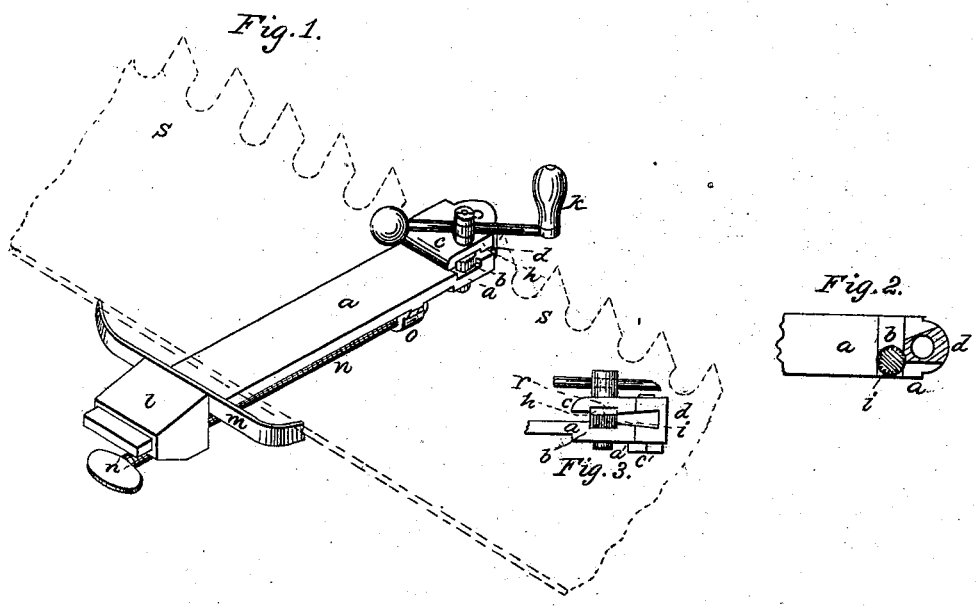

UNITED STATES PATENT OFFICE.

J. P. SPOFFORD, OF BROCKETS BRIDGE, NEW YORK.

SAW-GUMMER.

Specification of Letters Patent No. 10,415, dated January 10, 1854.

*To all whom it may concern:*

Be it known that I, J. P. SPOFFORD, of Brockets Bridge, in the county of Herkimer and State of New York, have invented certain new and useful Improvements in Saw-Gummers; and I do hereby declare that the same are described and represented in the following specification and drawings.

To enable others skilled in the art to make and use my improvements I will proceed to describe their construction and operations, referring to the drawings, in which the same letters indicate like parts in each of the figures.

Figure 1 is a perspective view of my gummer applied to a saw, represented by dotted lines. Fig. 2 is a section containing the cutter. Fig. 3 is a top view of the end in which the cutter turns.

A bar of metal $a$ is constructed in the form represented with an enlargement $a'$ at one end, and a recess $b$ for the cutter $i$, which cutter has journals extending from it fitted to holes in the bar $a$ and piece $c$, which is made in the form represented and provided with a projection $d$, made in the form represented, and intended to serve as a guide to the cutter $i$ whenever it comes in contact with the teeth of the saw. The collar $r$ is fitted to the journals of the cutter so as to be applied either side of it to change the working part of the cutter $i$, when it becomes dull to the other portion that is sharp, so as to make the cutter perform double service. One of the journals of the cutter $i$ extends beyond the piece $c$ and has the crank $k$ fastened to it by which the cutter is turned. The piece $c$ is fastened to the bar $a$ by the bolt $c'$, which passes through the bar and screws into the piece $c$. I make a block $l$ and fit it to traverse on the bar $a$, and make a female screw in it to which the screw $n$ is fitted, the end of said screw being fitted to a hole in the projection $o$ on the bar $a$, so as to turn freely, and provided with a nut and a washer and pin to hold it in when it is operated to traverse the block $l$, which block has the curved spring $m$ fastened to it and provided with a notch or score in each end for the back of the saw to prevent the spring from slipping from the saw in the operation of gumming.

To apply the gummer to the saw $s$ $s$ the screw $n$ is turned to draw the block $l$ and spring $m$ back when the cutter $i$ may be placed between the teeth of the saw, and the screw $n$ is turned to bring the notches in the spring $m$ against the back of the saw. The operator now operates the cutter by turning the crank $k$ with one hand and the screw $n$ with the other until the score between the teeth is cut to the depth required, the cutter $i$ being guided or prevented from cutting in a wrong direction by the projection $d$; and when one score is completed the cutter may be moved to the next by turning back the screw $n$ as before mentioned. When the spaces between the teeth in the cutter $i$ become full before they the teeth cease cutting the spring $m$ yields and allows such teeth to pass on until they come to the open space where the pieces or chips fall out, and in this way the yielding of the spring saves the teeth of the cutter from being broken which is a most important advantage resulting from the use of the spring. When that portion of the cutter toward the crank is worn dull and unfit for further service, the cutter may be taken out and the collar $r$ which has been in the recess $h$ taken off and applied to the opposite end of the cutter so as to occupy the recess $b$ and bring a new portion of the cutter into action and in this way it is made to perform double service and make a great saving of expense in the cutters used. And besides the advantages above enumerated if the cutter should spring in tempering which it is very liable to do, so as not to run exactly true the spring $m$ yields and accommodates itself to the inequalities in the cutter and saves it from being broken so often, as it would be, if it was fed up positively, and without the interposition of a spring or its equivalent.

I therefore claim as my invention and desire to secure by Letters Patent—

The combination of the cutter $i$ and collar $r$ with the recesses $b$ and $h$ so as to change the cutter when the teeth become dull from use on one part to the other part where they are sharp and thus make it perform double service substantially as described.

J. P. SPOFFORD.

Witnesses:
JAMES I. BROCKETT,
C. G. BROCKETT.